Sept. 10, 1940.　　　　H. M. ROTH　　　　2,214,348
HINGE
Filed Dec. 7, 1937　　　2 Sheets-Sheet 1

WITNESSES
A. B. Wallace
A. H. Oldham

INVENTOR.
Harry M. Roth
BY Brown, Critchlow & Rick
his ATTORNEYS.

Sept. 10, 1940.  H. M. ROTH  2,214,348
HINGE
Filed Dec. 7, 1937  2 Sheets-Sheet 2

Patented Sept. 10, 1940

2,214,348

UNITED STATES PATENT OFFICE 2,214,348

HINGE

Harry M. Roth, Bellevue, Pa., assignor to McKinney Manufacturing Company, Pittsburgh, Pa., a corporation of Pennsylvania Application December 7, 1937, Serial No. 178,449

2 Claims. (Cl. 16—136)

This invention relates to hinges, and more particularly is concerned with noiseless, self-lubricating hinges of heavy bearing type.

Heretofore, hinges, particularly of the heavy butt type, have been provided with various relatively complicated means for reducing friction between the hinge knuckles and the hinge pintle. For example, ball thrust bearings have been employed which include hardened steel balls and race rings. These have been found to be objectionable because of size and design restrictions, and often the amount of space is not sufficient to provide an adequate bearing for required loads. Also, it has been the practice to initially lubricate ball or other special bearings before they are completely assembled and then to surround them with a spun casing or other housing to protect them from the weather and to prevent the escape of lubricant. This renders subsequent lubrication difficult if the housing prevents the escape of lubricant in all positions of the hinge, so that such bearings for extended use are open to many objections. If the housings are eliminated, and even when they are not, escape of lubricant is a problem. Furthermore, in known special bearing hinges cost of manufacture is high and often shape and appearance is objectionable.

It is the general object of my invention to avoid and overcome the foregoing and other difficulties of and objections to known hinges of the character indicated by the provision of an improved noiseless, self-lubricating hinge which is adapted to be manufactured in substantially any size and which is capable of carrying relatively large loads and whose life is substantially indefinite.

Another object of my invention is to provide an improved hinge which is self-lubricating without any tendency to leak lubricant, and which is simple and inexpensive to manufacture.

Another object of my invention is the provision of a noiseless hinge having associated anti-friction means carrying any vertical or lateral force on the hinge.

The foregoing and other objects of my invention are achieved by the provision of a hinge having leaves formed with interfitting knuckles which receive a pintle, and bearing means spacing the opposed surfaces of the knuckles from one another, and, in some forms, the opposed surfaces of the pintle and the knuckle from one another. The bearing means are formed of porous metal having a resident body of lubricant.

Figure 1:
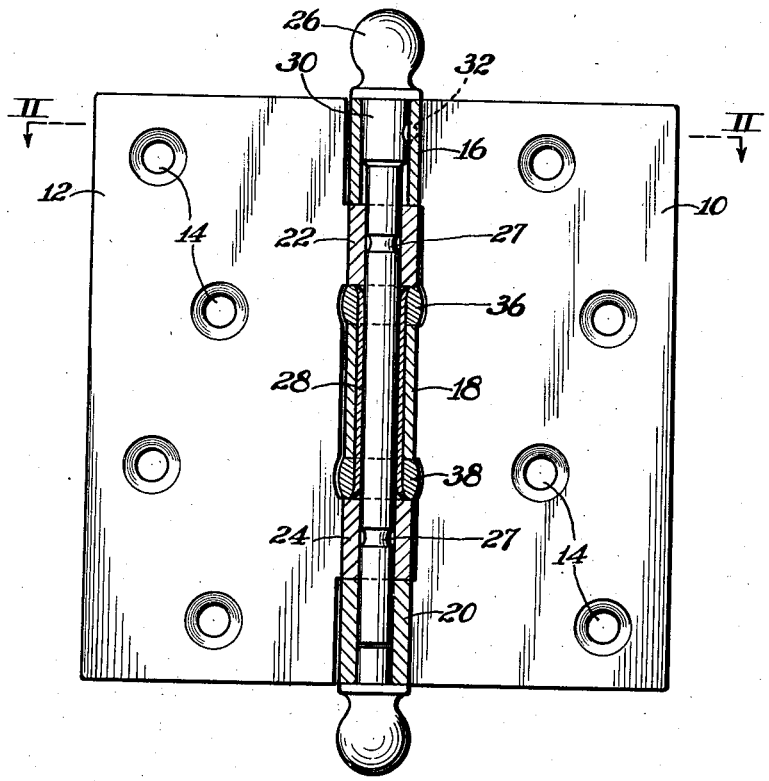
Figure 2:
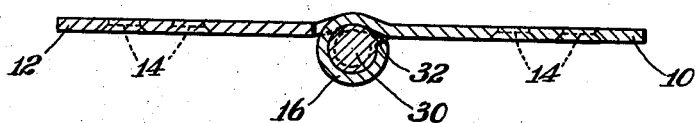
Figure 3:
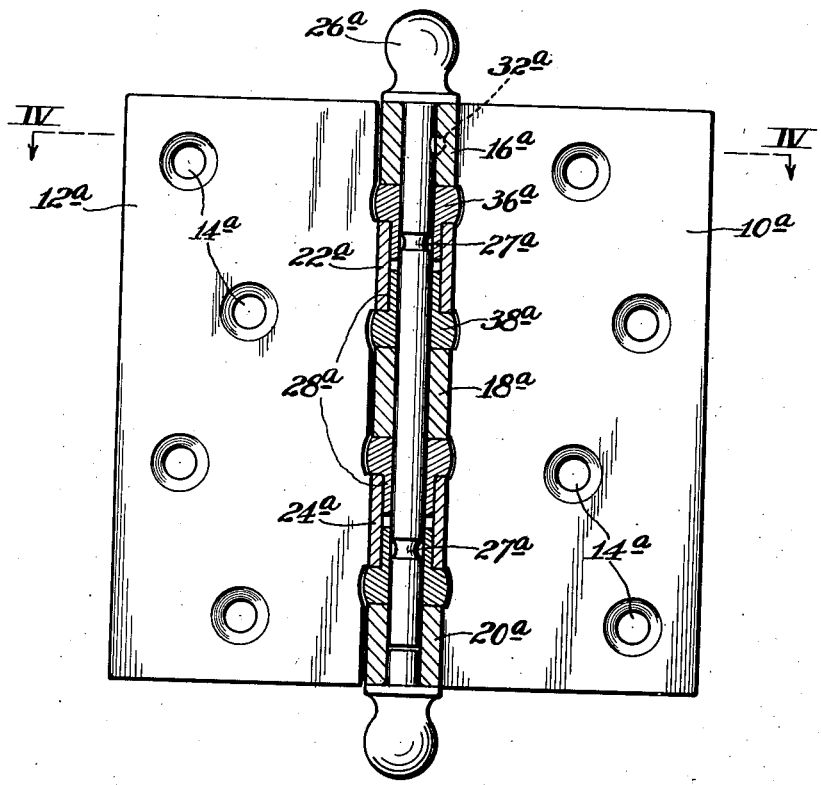
Figure 4:
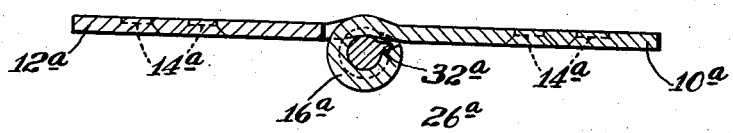

For a better understanding of my invention reference should be had to the accompanying drawings, in which Fig. 1 is a side elevation of one form of hinge incorporating the principles of my invention and having the knuckles shown in section to better illustrate the construction; Fig. 2 is a cross-sectional view taken on the line II—II of Fig. 1; Fig. 3 is a view similar to Fig. 1, but illustrates another embodiment of my invention; and Fig. 4 is a cross-sectional view taken on the line IV—IV of Fig. 3.

Although the principles of my invention are broadly applicable to hinges of various kinds, they are particularly beneficial in conjunction with relatively large butt hinges and accordingly have been so illustrated and will be so described.

In the embodiment of my invention shown in Figs. 1 and 2, the numerals 10 and 12 indicate hinge leaves having countersunk holes 14 or other means associated therewith whereby the leaves can be secured to a door and door jamb, or in other relations as will be understood. The leaf 10 is formed with knuckles 16, 18 and 20 and the leaf 12 with knuckles 22 and 24 which are adapted to be interfitted, as shown in Fig. 1, and receive a pintle 26 grooved as at 27.

I have found that for the sake of appearance the external diameter of each of the knuckles should be the same, but I make the wall thickness of the several knuckles of a different radial thickness. Specifically, knuckle 18 is made with a wall thickness less than the thickness of the leaf 10 so that a sleeve 28 can be received in the knuckle, which sleeve receives and supports the pintle 26. The wall thickness of the knuckles 22, 24 and 20 is slightly greater than the thickness of the leaves 10 and 12 so that these knuckles closely receive and support the pintle 26. The knuckle 16 may have a wall thickness identical to that of the knuckles 22, 24 and 20, but I may increase the diameter of the pintle 26 near its head end, as shown at 30. In this form of my invention the radial thickness of the knuckle 16 is substantially the same as the radial thickness of the knuckle 18, as has been illustrated.

In order to prevent relative rotary movement between the pintle 26 and one of the leaves of the hinge, as for example leaf 10, I strike up a tongue 32 on the portion 30 of the pintle which tongue extends out radially from the pintle and which is received in the groove between the circumferential end of knuckle 16 and the leaf 10, as is particularly shown in Fig. 2. In this manner relative movement between the pintle and knuckles 16, 18 and 20 is prevented and is confined to the knuckles 22 and 24.

An important part of my invention is the provision of anti-friction bearing surfaces between the hinge knuckles. To this end, sleeve 28 carries washers or rings 36 and 38 which are positioned respectively between knuckles 22 and 18 and knuckles 18 and 24. The rings 36 and 38 may be formed of the same outside diameter as the knuckles, but to add distinctiveness to the hinge and to differentiate it from other butt hinges, I preferably shape the rings as shown, which increases their strength and provides slightly larger bearing surfaces. The anti-friction rings 36 and 38 are made from a porous metal having a capacity for absorbing a large amount of lubricant which gradually sweats or exudes from the metal at a rate which is not affected by atmospheric temperature changes so that a fine film of lubricant is present at the bearing surfaces at all times. However, the tendency of the pores of the metal to retain the lubricant prevents its dissipation so that the bearing metal at all times has a resident body of lubricant which is held therein for almost an indefinite period of time.

A suitable porous composition may be produced by combining ten parts of powdered copper by weight and about eighty-eight parts of sponge iron by weight which is a finely comminuted amorphous iron powder and having particles that are highly porous. The metal powders are preferably placed in a suitable mixing mill and are thoroughly commingled. There is then added a small amount of lubricant, such as petroleum oil, or a solid lubricant, such as stearic or boracic acid. This lubricant is added to the mixture to aid in the compressing and forming operation and to a certain extent the sintering operation hereinafter mentioned.

The bearing member is then formed by compressing the material under a pressure of between about 25,000 pounds and about 50,000 pounds per square inch. The compressed article is then sintered at a temperature of between about 1500° to about 2100° F. in a non-oxidizing or reducing atmosphere. The oil which is the constituent lubricant in the finished bearing piece is then added, either by submerging the piece in oil as it comes from the sintering furnace or compartment before cooling, or it may be immersed in oil after it has cooled to room temperature. The porous structure of the bearing piece causes a substantial quantity of oil to be absorbed, the oil permeating through the body of the article to the surfaces thereof which are adapted to have bearing contact with the hinge parts.

The metal bearing parts thus produced are unusually tough and strongly resist wear or abrasion or disintegration of parts. They are also light in weight and readily formed to any desired shape. Various metal compositions such as porous bronze may be used in place of the sponge iron composition given above, and the exact composition may be varied to suit the strength, size and lubricating action desired, as will be understood.

While I have described only the rings 36 and 38 as being made from the anti-friction material, it will be recognized that any of the other parts of the hinge, and particularly the sleeve 28, can also be made from the anti-friction material. For example, I may even make the entire hinge of the anti-friction material although this is usually not necessary to achieve the advantages of my invention.

In the use of the hinge, constructed as above described, the vertical load on the hinge is carried directly between the knuckle 22 and the ring 36 or between the ring 38 and the knuckle 24. The ends of the sleeve 28 are usually terminated a little short of the bearing surfaces of the rings 36 and 38 so that a relatively wide bearing surface is provided which is self-lubricating and adapted to operate without noise and substantially without friction over long periods.

In the embodiment of my invention illustrated in Figs. 3 and 4 the same numerals have been employed for like parts except that the suffix *a* has been added. The knuckles 16a, 18a and 20a are formed of the same over-all diameters as the knuckles 22a and 24a but are made with a radial wall thickness usually slightly greater than the thickness of the leaf 10 so that they receive and closely support the pintle 26a, which is conveniently made of the same diameter throughout except for grooves 27a. The knuckles 22a and 24a are, on the other hand, formed with a radial wall thickness slightly less than that of the leaf 12a so that sleeves 28a can be received between the knuckles and the pintle. The sleeves 28a are made integral with bearing rings 36a and 38a and are less than half the axial length of the knuckle so that the rings 36a and 38a can be held in bearing relation by pressing the sleeves 28a into the ends of the knuckles 22a and 24a as shown. The sleeves 28a and bearing rings 36a and 38a are made of the porous bearing metal heretofore described having a resident body of lubricant.

The pintle 26a is formed with a struck-up tongue 32a which, as seen in Fig. 4, is received in the groove between the circumferential end of the knuckle 16a and the leaf 10a so that rotary movement of the pintle 26a with respect to the leaf 10a and knuckles 16a, 18a and 20a is prevented. Thus in the operation of this form of my invention the bearing sleeves 28a and the bearing rings 36a and 38a rotatably receive the pintle 26a to provide anti-friction bearing surfaces therefor, and likewise provide bearing surfaces between the knuckles 16a, 18a and 20a and the knuckles 22a and 24a. Thus the only rotary bearing surfaces in the hinge are anti-friction surfaces of porous metal bearing members having resident bodies of lubricant.

From the foregoing, it will be recognized that the objects of my invention have been achieved by the provision of an anti-friction hinge adapted to carry relatively large vertical or lateral loads. The hinges are noiseless and are self-lubricating without any danger of leaking lubricant, and function satisfactorily over long periods, as for example the life of the hinge, without attention or repair. The hinges are inexpensively and readily manufactured and can be made in substantially any size and for any purpose without limitations as to the size of the bearing parts.

While I have specifically illustrated and described two embodiments of my invention, it should be appreciated that my invention is not limited thereto or thereby but is defined in the appended claims.

I claim:

1. A hinge including a pair of leaves, interfitting knuckles on the leaves, a pintle, the knuckles on one leaf slidably but non-rotatably receiving the pintle, said knuckles being of greater wall thickness than the body of the leaves, the knuckles of the second leaf being of less wall thickness than the body of the leaves but having the same outside diameter as the knuckles on the said one leaf, a plurality of sleeves formed of porous lubricant containing metal slidably received in the larger openings of the knuckles of the said second leaf and slidably receiving the pintle, and rings formed integral with the sleeves and of the same metal and positioned between the knuckles of the said one leaf and the knuckles of said second leaf.

2. A hinge including a pair of leaves, interfitting knuckles of substantially the same outside diameter on the leaves, a pintle, the knuckles on one leaf slidably but non-rotatably receiving the pintle, a pair of sleeves formed of porous lubricant containing metal received in each knuckle of the said second leaf and slidably receiving the pintle, and a ring formed integral with an end of each sleeve and of the same metal and positioned between a knuckle of the said one leaf and a knuckle of the said second leaf.

HARRY M. ROTH.